(12) United States Patent
Harada

(10) Patent No.: US 11,327,994 B2
(45) Date of Patent: May 10, 2022

(54) ARRANGING CONVERTED OPERATION HISTORY INFORMATION

(71) Applicant: FUJIFILM BUSINESS INNOVATION CORP., Tokyo (JP)

(72) Inventor: Yushi Harada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 326 days.

(21) Appl. No.: 16/562,523

(22) Filed: Sep. 6, 2019

(65) Prior Publication Data
US 2020/0278981 A1 Sep. 3, 2020

(30) Foreign Application Priority Data

Mar. 1, 2019 (JP) .............................. JP2019-037420

(51) Int. Cl.
*G06F 16/25* (2019.01)
*G06N 20/00* (2019.01)

(52) U.S. Cl.
CPC .......... *G06F 16/258* (2019.01); *G06N 20/00* (2019.01)

(58) Field of Classification Search
None
See application file for complete search history.

(56) References Cited

U.S. PATENT DOCUMENTS

| 6,012,067 | A   | * | 1/2000  | Sarkar ................. G06F 16/252 |
| 8,438,132 | B1  | * | 5/2013  | Dziuk .................. G06F 16/258 707/635 |
| 10,592,472 | B1 | * | 3/2020  | Jarasius ............... G06F 16/258 |
| 2005/0256892 | A1 | * | 11/2005 | Harken ............... G06F 16/254 |
| 2008/0005144 | A1 | * | 1/2008  | Katz ................... G06F 16/258 |
| 2011/0202536 | A1 | * | 8/2011  | Chen .................. G06F 16/258 707/740 |
| 2014/0067804 | A1 |   | 3/2014  | Yoshizawa et al. |
| 2017/0329832 | A1 | * | 11/2017 | Izad .................... G06F 16/258 |
| 2018/0101647 | A1 | * | 4/2018  | Lloyd ................. G06F 16/258 |
| 2018/0253669 | A1 | * | 9/2018  | Thunoli .............. G06Q 10/067 |
| 2020/0357524 | A1 | * | 11/2020 | Chan .................. G06K 9/623 |

FOREIGN PATENT DOCUMENTS

JP 2014-048673 A 3/2014

* cited by examiner

*Primary Examiner* — Scott A. Waldron
(74) *Attorney, Agent, or Firm* — Oliff PLC

(57) ABSTRACT

An information processing device includes an acquiring unit, a shaping unit, and an integration unit. The acquiring unit is configured to acquire operation history information from plural systems, respectively. The shaping unit is configured to shape each operation history information acquired by the acquiring unit into operation history information in a unified format. The integration unit is configured to arrange and integrate the operation history information after being shaped by the shaping unit in chronological order.

4 Claims, 10 Drawing Sheets

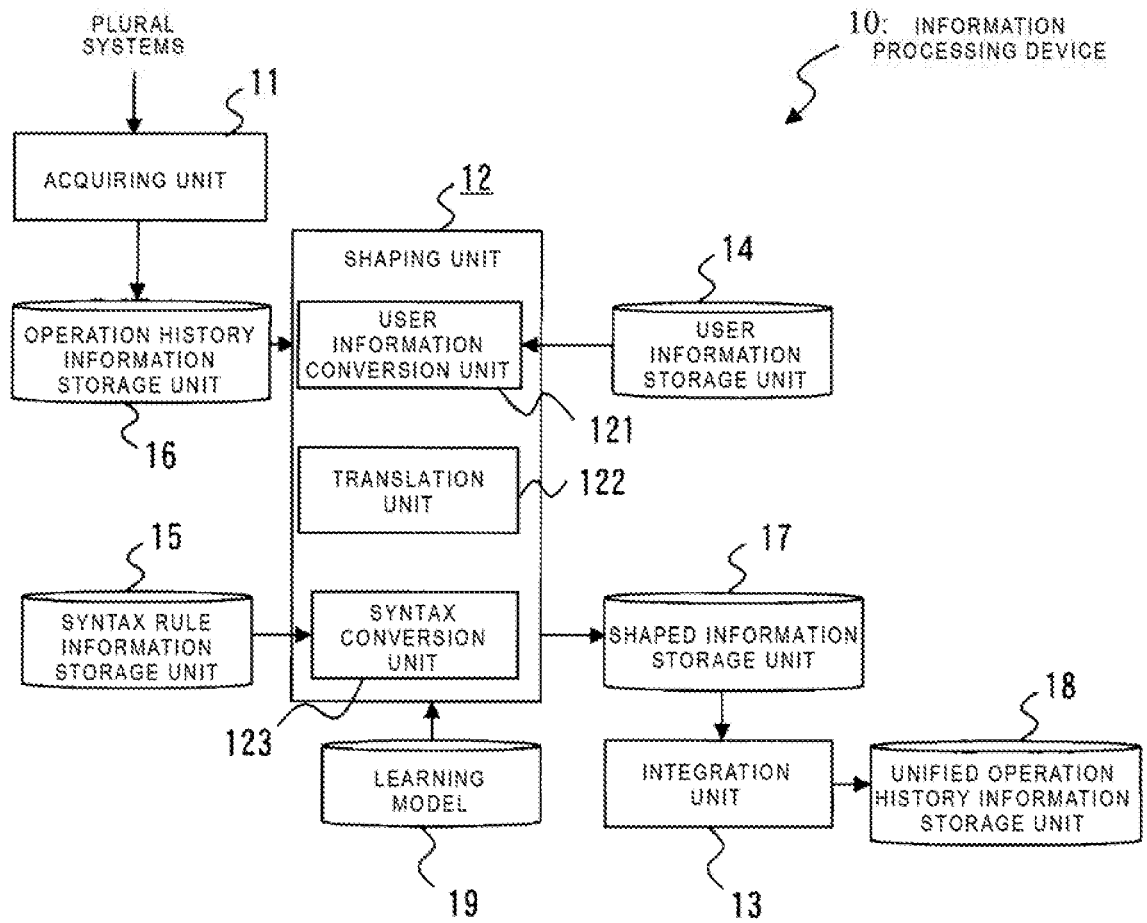

FIG. 6

| TARGET 1 | TARGET 2 | + |

| | |
|---|---|
| HOST NAME/IP | 111.222.333.444 |
| PORT NUMBER | 8080 |
| DATABASE NAME | operationdb |
| USER NAME | administrator |
| PASSWORD | ************ |
| SQL | SELECT id, Operation FROM Oject Operationtable |

[ SAVE ]

FIG. 7

| TARGET 1 | TARGET 2 | TARGET 3 | + |

| HOST NAME/IP | 111.222.333.444 |
| PORT NUMBER | 8080 |
| USER NAME | administrator |
| PASSWORD | ************ |
| TARGET DIRECTORY | C:¥operation¥log |
| TARGET FILE | *.log, *.csv, *.txt |

SAVE

FIG. 8

| TARGET 1 | TARGET 2 | TARGET 3 | TARGET 4 | + |

TARGET URL: http://chat.com/ticket-111
USER NAME: administrator
PASSWORD: ************
ACQUISITION FORMAT: HTML FORMAT ▽

[SAVE]

FIG. 9A

SYSTEM A (WORKFLOW SERVER)

```
13:11:34 User-A executed Workflow-A.
15:16:17 User-C approved Workflow-A.
```

FIG. 9B

SYSTEM B (REPOSITORY)

```
07:40:12 yamada created 機能仕様書A to 機能仕様書フォルダ.
11:30:50 yamada updated 機能仕様書A in 機能仕様書フォルダ.
```

FIG. 9C

SYSTEM C (FILE SYSTEM)

```
08:00:15 山田さんが鈴木さんにメッセージを投稿しました。"鈴木さん、
下記に格納した機能仕様書のレビューをお願いいたします。
"http://repository-A.com/specification-A.docx"
10:48:50 鈴木さんが山田さんにメッセージを投稿しました。"山田さん、
レビューを完了しました。
```

FIG. 10A

OPERATION HISTORY INFORMATION FROM SYSTEM A

```
13:11:34 User-A executed Workflow-A.
15:16:17 User-C approved Workflow-A.
```

CONVERSION OF USER INFORMATION
NO TRANSLATION
NO SYNTAX CONVERSION

FIG. 10B

OPERATION HISTORY INFORMATION AFTER BEING SHAPED

```
13:11:34 yamada executed Workflow-A.
15:16:17 sato approved Workflow-A.
```

FIG. 11A

OPERATION HISTORY INFORMATION FROM SYSTEM C

```
08:00:15 山田さんが鈴木さんにメッセージを投稿しました。"鈴木さん、
下記に格納した機能仕様書のレビューをお願いいたします。
 "http://repository-A.com/specification-A.docx"
10:48:50 鈴木さんが山田さんにメッセージを投稿しました。"山田さん、
レビューを完了しました。
```

CONVERSION OF USER INFORMATION

FIG. 11B

OPERATION HISTORY INFORMATION AFTER USER INFORMATION IS CONVERTED

```
08:00:15 yamadaがsuzukiにメッセージを投稿しました。"suzuki、下記に
格納した機能仕様書のレビューをお願いいたします。
 "http://repository-A.com/specification-A.docx"
10:48:50 suzukiがyamadaにメッセージを投稿しました。"yamada、レビュ
ーを完了しました。
```

TRANSLATION INTO ENGLISH

FIG. 11C

OPERATION HISTORY INFORMATION AFTER TRANSLATED INTO ENGLISH

```
08:00:15 yamada posted a message to suzuki. "Suzuki, please review
the functional specification stored in the below.
 "http://repository-A.com/specification-A.docx"
10:48:50 suzuki posted a message to yamada. "Yamada, I finished the
review."
```

SYNTAX CONVERSION

FIG. 11D

OPERATION HISTORY INFORMATION AFTER BEING SHAPED

```
08:00:15 yamada asks suzuki to review the functional specification
stored in the below.
 "http://repository-A.com/specification-A.docx"
10:48:50 suzuki tells yamada that I finished the review.
```

FIG. 12

OPERATION HISTORY INFORMATION AFTER BEING INTEGRATED

```
07:40:12 yamada created 機能仕様書A to 機能仕様書フォルダ.
08:00:15 yamada posted a message to suzuki.
08:00:15 yamada asks suzuki to review the functional specification
stored in the below.
  "http://repository-A.com/specification-A.docx"
10:48:50 suzuki tells yamada that I finished the review.
11:30:50 yamada updated 機能仕様書A in 機能仕様書フォルダ.
13:11:34 yamada executed Workflow-A.
15:16:17 sato approved Workflow-A.
```

FIG. 13

INPUT DATA (TRAINING DATA)

DATA 1
yamada posted a message to suzuki. "Suzuki, please review the functional specification stored in the below.
 "http://repository-A.com/specification-A.docx"

DATA 2
Suzuki posted a message to sato. "Could you review the specification?"

OUTPUT DATA (TEACHER DATA)

A asks B to review C.

INPUT DATA (TRAINING DATA)

DATA 1
suzuki posted a message to yamada. "Yamada, I finished the review."

DATA 2
yamada posted a message to sato. "Did you finish the review?"

OUTPUT DATA (TEACHER DATA)

A tells B that C.

FIG. 14

OPERATION HISTORY INFORMATION BEFORE CONVERSION yamada posted a message to suzuki. "Suzuki, please review the functional specification stored in the below.
"http://repository-A.com/specification-A.docx"

19 LEARNING MODEL

SYNTAX RULE

A asks B to review C.

ARRANGING CONVERTED OPERATION HISTORY INFORMATION

CROSS-REFERENCE TO RELATED APPLICATIONS

This application is based on and claims priority under 35 USC 119 from Japanese Patent Application No. 2019-037420 filed Mar. 1, 2019.

BACKGROUND

1. Technical Field

The present disclosure relates to an information processing device and a non-transitory computer readable medium.

2. Related Art

In the related art, a workflow for a data operation is generated from history information recorded when an operation is performed on a database. For example, JP-A-2014-048673 proposes a technique capable of generating a workflow, even when data operations are performed by plural users, by quantifying the relationship between the data operations by the plural users using data definition of a database and a history of operation announcement to data on a database.

SUMMARY

The format of operation history information is determined by a system. Therefore, although it is desired in some cases to use the operation history information existing in plural systems for a certain purpose such as generating a workflow, the operation history information may be unavailable because the format of the operation history information is not unified among the plural systems.

Aspects of non-limiting embodiments of the present disclosure relate to arranging operation history information described in different formats into operation history information in a unified format.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: an acquiring unit configured to acquire operation history information from plural systems, respectively; a shaping unit configured to shape each operation history information acquired by the acquiring unit into operation history information in a unified format; and an integration unit configured to arrange and integrate the operation history information after being shaped by the shaping unit in chronological order.

BRIEF DESCRIPTION OF THE DRAWINGS

Exemplary embodiment(s) of the present disclosure will be described in detail based on the following figures, wherein:

FIG. 1 is a block configuration diagram showing an exemplary embodiment of an information processing device according to the present disclosure;

FIG. 2 is a diagram showing an example of a data structure of user information stored in a user information storage unit in the present exemplary embodiment;

FIG. 3 is a diagram showing an example of a data structure of syntax rule information stored in a syntax rule information storage unit in the present exemplary embodiment;

FIG. 6 is a diagram showing an example of a display screen used when the operation history information is acquired from an external database system in the present exemplary embodiment;

FIG. 7 is a diagram showing an example of a display screen used when the operation history information is acquired from an external file system in the present exemplary embodiment;

FIG. 8 is a diagram showing an example of a display screen used when the operation history information is acquired from an external site in the present exemplary embodiment;

FIGS. 9A to 9C are diagrams showing examples of formats of plural types of operation history information acquired from an outside in the present exemplary embodiment;

FIGS. 10A and 10B are diagrams showing an example of a method of converting the operation history information acquired from the external system via the API into operation history information in a unified format in the present exemplary embodiment;

FIGS. 11A to 11D are diagrams showing an example of a method of converting the operation history information acquired from the external file system into operation history information in a unified format in the present exemplary embodiment;

FIG. 12 is a diagram showing integrated operation history information in the unified format in the present exemplary embodiment;

FIG. 13 is a diagram showing examples of data used for machine learning by a learning model in the present exemplary embodiment; and FIG. 14 is a diagram showing a method of specifying a syntax rule to be used for conversion of the operation history information using the learning model in the present exemplary embodiment.

DETAILED DESCRIPTION

Figure 4:
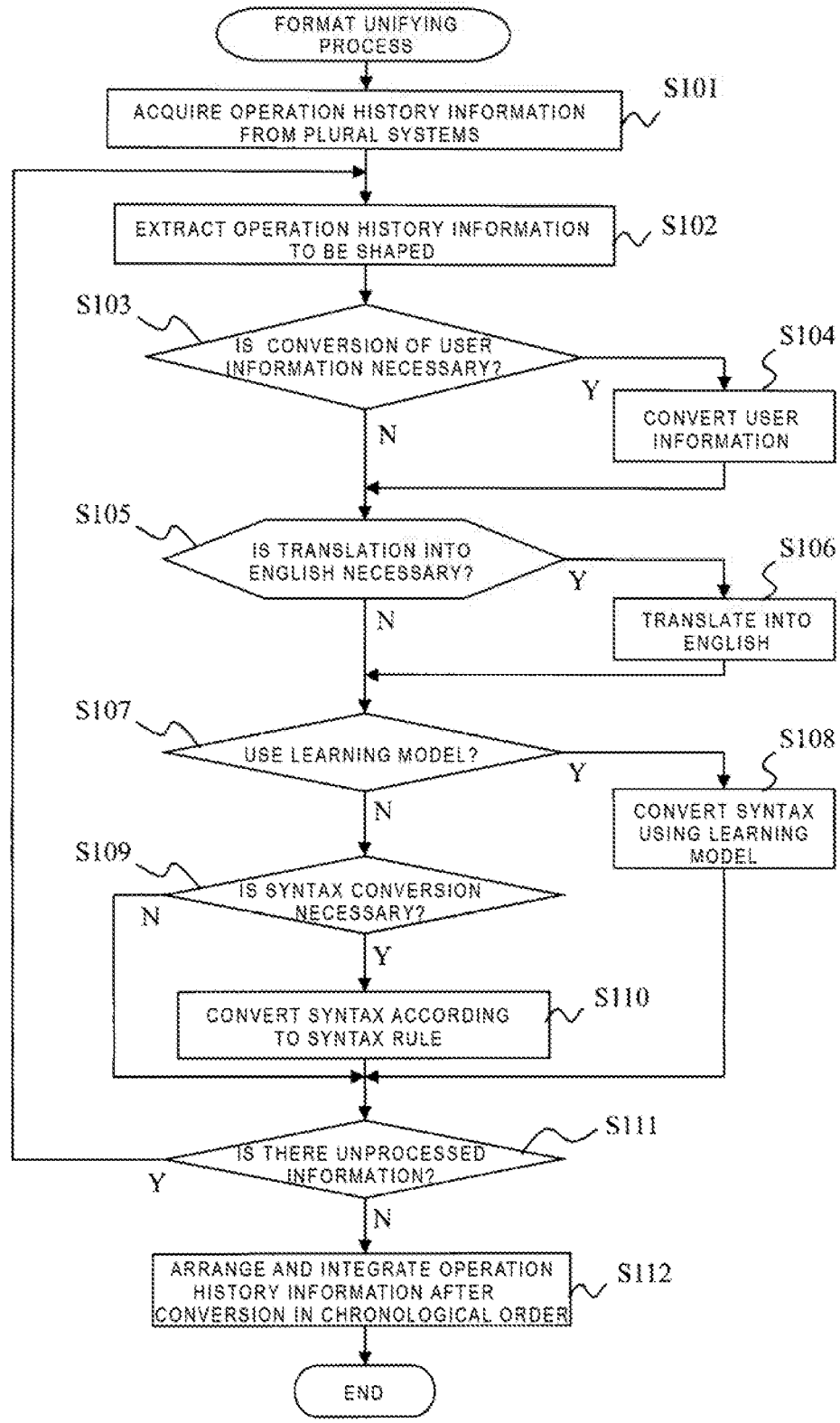
FIG. 4 is a flowchart showing format unifying process of the operation history information in the present exemplary embodiment.

Hereinafter, suitable exemplary embodiments of the present disclosure will be described based on the drawings.

FIG. 1 is a block configuration diagram showing an exemplary embodiment of an information processing device according to the present disclosure. An information processing device 10 according to the present exemplary embodiment may be implemented by a computer such as a general-purpose personal computer (PC). That is, the information processing device 10 includes a CPU, a storage unit such as a ROM, a RAM, and a hard disk drive (HDD), and a network interface serving as a communication unit that acquires operation history information from an external system. The information processing device 10 may include a user interface which exchanges information with a user, for example, a mouse or a keyboard as an input unit, and a display as a display unit.

As shown in FIG. 1, the information processing device 10 according to the present exemplary embodiment includes an acquiring unit 11, a shaping unit 12, an integration unit 13, a user information storage unit 14, a syntax rule information storage unit 15, an operation history information storage unit 16, a shaped information storage unit 17, a unified operation history information storage unit 18, and a learning model 19. Elements not used in the description of the present exemplary embodiment are omitted in the drawings.

The acquiring unit 11 acquires the operation history information from plural external systems. The shaping unit 12 shapes all of the operation history information acquired by the acquiring unit 11 into operation history information in a unified format. The integration unit 13 arranges and integrates the operation history information after being shaped into the unified format by the shaping unit 12 in chronological order.

The shaping unit 12 includes a user information conversion unit 121, a translation unit 122, and a syntax conversion unit 123. The user information conversion unit 121 converts, with reference to user information conversion information, a representation of user information included in the operation history information acquired by the acquiring unit 11 into a representation of user information used in the operation history information in the unified format. The translation unit 122 executes a translation process to unify a language used in the operation history information acquired by the acquiring unit 11 into a language having a uniform sentence structure. The phrase "a language having a uniform sentence structure" refers to a uniform language in which the order of words such as a subject, a predicate, and an object is substantially fixed. In the present exemplary embodiment, Japanese is used as an example of a language having a non-uniform sentence structure, and English is used as an example of the language having the uniform sentence structure. The syntax conversion unit 123 converts, with reference to syntax conversion information, syntax of each of the operation history information in which the sentence structures are unified into a uniform language (that is, English) into syntax to be adopted in the operation history information in the unified format.

FIG. 2 is a diagram showing an example of a data structure of the user information stored in the user information storage unit 14 in the present exemplary embodiment. The user information is user information conversion information that is referred to in converting a representation of the user information included in the operation history information acquired by the acquiring unit 11 into a representation of user information used in the operation history information in the unified format. The user information is generated for each user. The users of the information processing device 10 are given user IDs as identification information for identifying themselves. In the user information, a user handle name, a user name, a last name, and a first name of each user are associated with the user ID of the each user. All of the user handle name, the user name, the last name, and the first name are information for specifying the same user identified by the user ID. In the present exemplary embodiment, an item value set to the user name among the information set in the user information is used as a notation for representing the user in the operation history information in the unified format.

FIG. 3 is a diagram showing an example of a data structure of the syntax rule information stored in the syntax rule information storage unit 15 in the present exemplary embodiment. The syntax rule information is syntax conversion information in which the syntax which are to be used in English which is used as the language having the uniform sentence structure and which are to be used in the operation history information are associated with the syntax to be adopted in the operation history information in the unified format. In the syntax rule information, syntax of "before conversion" and syntax of "after conversion" are associated with a rule ID as identification information for identifying each syntax rule. The syntax used in the operation history information acquired by the acquiring unit 11, that is, the syntax used in the operation history information before conversion is set in "before conversion". The syntax used when syntax before conversion is converted into syntax to be adopted in the operation history information in the unified format is set in "after conversion".

The user information storage unit 14 and the syntax rule information storage unit 15 need to be prepared by an administrator or the like before the information processing device 10 of the present exemplary embodiment operates. Every time operation history information in a new format is acquired, the administrator or the like may register (i) the syntax used in the acquired operation history information, and if necessary, to be used in the operation history information after being translated into English and (ii) syntax to be adopted in the operation history information in the unified format for the syntax in the syntax rule information storage unit 15 in association with each other.

Since the operation history information storage unit 16, the shaped information storage unit 17, and the unified operation history information storage unit 18 are generated by the information processing device 10 operating, description of these units will be made together with description of the operation. Description of the learning model 19 will be also made together with description of the operation.

Each of the elements 11 to 13 in the information processing device 10 is implemented by a cooperative operation of a computer that constitutes the information processing device 10 and a program that operates on a CPU mounted on the computer. Each of the storage units 14 to 19 is implemented by an HDD mounted on the information processing device 10. Alternatively, a RAM or an external storage unit may be used via a network.

The program used in the present exemplary embodiment may be provided by the communication unit. Alternatively, the program may also be stored in and provided from a computer readable recording medium such as a CD-ROM or a USB memory. The program provided by the communication unit or from the recording medium is installed in the computer, and the program is executed by the CPU of the computer to sequentially implement various types of processes.

For example, when a process which includes plural sub-processes is executed, plural external systems may operate in cooperation with each other. That is, the plural external systems respectively and sequentially execute the sub-processes according to a user operation. Each system generates and internally stores operation history information related to the sub-processes executed according to the user operation. That is, the operation history information related to the one process exist in the plural external systems. It may be desired to integrate the operation history information related to the one process in one information processing device and generate a workflow for the process.

However, formats of the operation history information respectively generated by the plural external systems are not always unified. Therefore, even if the operation history information are collected from the plural external systems and simply put together, the operation history information may not be used unless the formats of the operation history information are unified.

Therefore, in the present exemplary embodiment, the operation history information described in different formats is shaped so as to be arranged in operation history information in a unified format. Hereinafter, a format unifying process of the operation history information in the present exemplary embodiment will be described with reference to a flowchart shown in FIG. 4.

First, the acquiring unit 11 acquires operation history information from the plural external systems respectively. In the present exemplary embodiment, a setting screen is provided that allows the user to acquire the operation history information from the external systems as shown in FIGS. 5 to 8.

Figure 5:
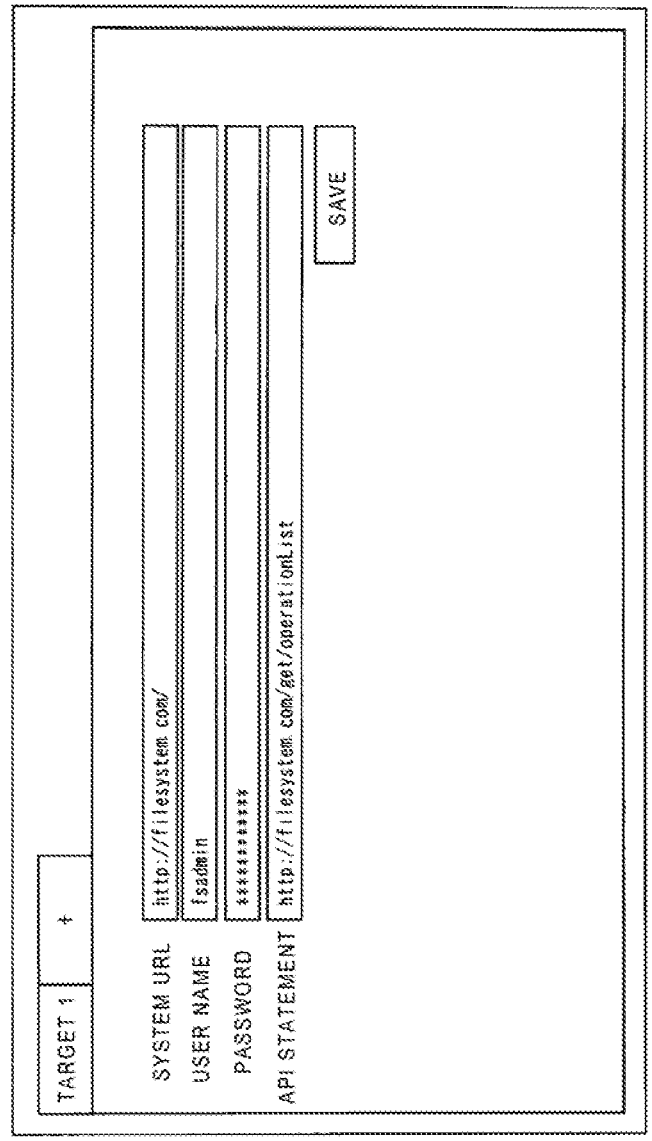
FIG. 5 is a diagram showing an example of a display screen used when the operation history information is acquired from an external system via an API in the present exemplary embodiment.

FIG. 5 is a diagram showing an example of the setting screen for acquiring the operation history information from the external system via an application programming interface (API). The user inputs, from the setting screen, information necessary for acquiring the operation history information such as an acquisition destination, authentication information, and a command.

FIG. 6 is a diagram showing an example of the setting screen for acquiring the operation history information by a structured query language (SQL) statement from an external database system. The user inputs, from the setting screen, information necessary for acquiring the operation history information such as information specifying a storage location of the operation history information, the authentication information, and a command.

FIG. 7 is a diagram showing an example of the setting screen for designating and acquiring a file, that is, the operation history information from an external file system. The user inputs, from the setting screen, information necessary for acquiring the operation history information such as information for selecting the operation history information, information specifying the storage location of the operation history information, and the authentication information.

FIG. 8 is a diagram showing an example of the setting screen for acquiring the operation history information from an external Web site. The user inputs, from the setting screen, information necessary for acquiring the operation history information such as the storage location of the operation history information, the authentication information, and an acquisition format of the operation history information, that is, a description format of the operation history information on the Web site (for example, hypertext markup language (HTML), comma separated value (csv), text or the like).

The user performs a user operation for acquiring the operation history information from the setting screen, so that the acquiring unit 11 acquires the operation history information from the plural external systems, respectively, and stores the acquired operation history information in the operation history information storage unit 16 (step 101). The operation history information acquired by the acquiring unit 11 is operation history information corresponding to the operation by the user as described above. The user uses the setting screen so as to acquire the operation history information related to one process, that is, operation history information that are generated in response to execution of sub-processes included in the one process, or alternatively, operation history information when the user operates one database from plural systems within a predetermined period of time.

FIGS. 9A to 9C are diagrams showing examples of the formats of plural types of operation history information acquired by the acquiring unit 11 in response to the user operation described above. FIG. 9A shows an example of operation history information acquired from a workflow server that is an external system via the API. FIG. 9B shows an example of operation history information acquired from a repository owned by the external database system. FIG. 9C shows an example of operation history information acquired from an external file system. As shown in FIGS. 9A to 9C, the format of the operation history information may differ depending on the external system which is the acquisition destination. The acquired operation history information includes at least a description showing the content of the operation, and information on what date and time the operation is performed.

When the acquiring unit 11 acquires the operation history information as described above, the shaping unit 12 shapes all of the operation history information into operation history information in the unified format. Therefore, the shaping unit 12 extracts one piece of operation history information to be shaped from the operation history information acquired by the acquiring unit 11 (step 102).

Next, the user information conversion unit 121 in the shaping unit 12 converts, with reference to the user information, the representation of the user information included in the operation history information into a representation of the user information used in the operation history information in the unified format if necessary. FIG. 10A shows the operation history information shown in FIG. 9A. As described above, in the present exemplary embodiment, when the operation history information acquired from the outside is shaped into the operation history information in the unified format, the user names in the user information are unified. In FIGS. 10A and 10B, the operation history information in the same format are put together for the sake of convenience. In the example of the two pieces of operation history information shown in FIG. 10A, the user information are represented by the user handle names as shown by enclosed bold dashed lines, and are not the user names in the unified format. Therefore, as in this example here, when it is necessary to convert the representation of the user information of the operation history information (Y in step 103), the user information conversion unit 121 converts the user information described in the operation history information (in this example, the user handle name) into the user name (step 104). If the user information described in the operation history information is the user name, the conversion is not necessary (N in step 103), and therefore, the process proceeds to the next step without conversion.

Next, the translation unit 122 in the shaping unit 12 translates, if necessary, the operation history information in which the user information is shaped into the unified format of user name, into English. That is, when the operation history information is not described in English, it is determined that translation into English is necessary (Y in step 105), and the operation history information is translated into English (step 106). On the other hand, as in this example here, when the operation history information is described in English, the translation into English is unnecessary (N in step 105), and the process proceeds to the next step without translation.

Next, the syntax conversion unit 123 in the shaping unit 12 converts, if necessary, the syntax of the operation history information in which the user information is shaped into the unified format of user name and which is in English (hereinafter referred to as "operation history information before conversion"). At this time, it is determined whether to use the learning model 19 or not. The operation related to the learning model 19 will be described later, and the case without using the learning model 19 will be described here. When the learning model 19 is not used (N in step 107), the syntax conversion unit 123 then determines that the syntax conversion is necessary when the syntax of the operation history information before conversion does not match any one of the syntax set in the item "after conversion" in the syntax rule information set in the syntax rule information storage unit 15. When it is determined that the syntax conversion is necessary (Y in step 109), the syntax conversion unit 123 refers to the syntax rule information, compares the syntax of the operation history information before conversion with the syntax set in the item "before conversion" in the syntax rule information, and specifies a syntax rule to be used for the conversion by finding the matching syntax. Then, the syntax conversion unit 123 converts the syntax of the operation history information before conversion into syntax set in the item "after conversion" corresponding to the specified syntax (step 110).

On the other hand, as in this example here, since the syntax of the operation history information before conversion matches one of the syntax set in the item "after conversion" in the syntax rule information, it is determined that the syntax conversion is unnecessary (N in step 109), and the process proceeds to step 111.

As described above, the operation history information to be shaped is shaped into operation history information in the unified format. FIG. 10B shows the operation history information after being converted into the unified format by shaping the operation history information before being shaped shown in FIG. 10A. The shaping unit 12 stores the operation history information converted into the unified format as described above, in the shaped information storage unit 17.

Next, when there is operation history information for which the shaping processing by the shaping unit 12 as described is not completed (Y in step 111), the process returns to step 102, and the steps described above are repeatedly executed for the operation history information to be shaped.

The operation history information shown in FIG. 9B is the operation history information matching the unified format in the user information, the language, and the syntax, so that particular conversion or translation of the information are unnecessary in the shaping process by the shaping unit 12, and the operation history information acquired from the external system can be used as the operation history information in the unified format as it is. Also in this case, the shaping unit 12 stores the operation history information in the unified format in the shaped information storage unit 17. The syntax conversion converts the syntax into one in English. However, not all words are converted into alphabets.

Next, FIG. 11A shows the operation history information shown in FIG. 9C. As described above, in the present exemplary embodiment, when the operation history information acquired from the outside is shaped into the operation history information in the unified format, the user names in the user information are unified. In FIGS. 11A to 11D, the operation history information in the same format are put together for the sake of convenience. In the example of the two pieces of operation history information shown in FIG. 11A, the user information is represented by the last name with an honorific title ("さん") as shown by enclosed bold dashed lines, and is not in the unified format of user name. Therefore, as in this example here, when it is necessary to convert the representation of the user information of the operation history information (Y in step 103), the user information conversion unit 121 converts the user information described in the operation history information (last name in this example here) into the user name (step 104). In the flowchart shown in FIG. 4, since the process which does not correspond to the example shown in FIGS. 11A to 11D (for example, N in step 103) is already described with reference to FIGS. 10A and 10B, the description thereof will be omitted. The operation history information having the user information after conversion is shown in FIG. 11B.

Next, the translation unit 122 in the shaping unit 12 translates, if necessary, the operation history information in which the user information is shaped into the unified format of user name, into English. That is, as in the example shown here, since the operation history information is not described in English, it is determined that translation into English is necessary (Y in step 105), and the operation history information is translated into English (step 106). The operation history information after translation is shown in FIG. 11C.

Next, the syntax conversion unit 123 in the shaping unit 12 converts, if necessary, the syntax of the operation history information before conversion. At this time, it is determined whether to use the learning model 19 or not. When the learning model 19 is not used here (N in step 107), the syntax conversion unit 123 uses the syntax rule information set in the syntax rule information storage unit 15. That is, as in this example here (operation history information before conversion shown in FIG. 11C), when the syntax of the operation history information before conversion does not match any one of the syntax set in the item "after conversion" in the syntax rule information set in the syntax rule information storage unit 15, the syntax conversion unit 123 determines that the syntax conversion is necessary (Y in step 109). Then, the syntax conversion unit 123 compares the syntax of the operation history information before conversion with the syntax set in the item "before conversion" in the syntax rule information, and specifies a syntax rule to be used for the conversion by finding the matching syntax. Then, the syntax conversion unit 123 converts the syntax of the operation history information before conversion into syntax set in the item "after conversion" corresponding to the specified syntax (step 110). FIG. 11D shows the operation history information after the syntax conversion, that is, the operation history information after being converted into the unified format by shaping the operation history information before being shaped shown in FIG. 11A. The shaping unit 12 stores the operation history information converted into the unified format as described above, in the shaped information storage unit 17.

As described above, when all the operation history information acquired by the acquiring unit 11 are shaped by the shaping unit 12 (N in step 111), the integration unit 13 arranges and integrates the operation history information stored in the shaped information storage unit 17 in chronological order with reference to the respective date and time information (step 112). The operation history information after being integrated is shown in FIG. 12.

As shown in FIG. 12, since the operation history information acquired from the plural external systems in different formats are arranged in the unified format, for example, the operation history information in the single format is referred to when a program of a process that uses the operation history information, such as workflow generating process, is executed. Therefore, the process of unifying the formats of the operation history information is unnecessary when each program is executed.

The learning model 19 will be described here.

As described above, the learning model 19 is used when the syntax of the operation history information before conversion is converted into the syntax to be adopted in the operation history information in the unified format. When the learning model 19 is not used, in other words, when the syntax rule information is used, the syntax of the operation history information before conversion needs to be set in either of the items "after conversion" and "before conversion" in the syntax rule information. When the operation history information has been acquired from the external system in the past, the administrator or the like may refer to the operation history information, and additionally register the syntax rule information in the syntax rule information storage unit 15. However, when operation history information is acquired from a certain external system for the first time, syntax of the operation history information may not be registered in the syntax rule information storage unit 15. Therefore, in the present exemplary embodiment, the learning model 19 is provided for the syntax conversion of the operation history information.

The learning model 19 is trained by supervised machine learning. FIG. 13 is a diagram showing examples of data in the machine learning. As shown in FIG. 13, a set of input data (training data) and output data (teacher data) to be used in the machine learning is prepared for the machine learning. The input data may use new syntax to be used in the operation history information. The output data is prepared by the administrator or the like referring to the new syntax.

FIG. 14 is a conceptual diagram of a process of converting the syntax of the operation history information before conversion using the learning model 19. When the syntax rule information is used, a syntax error occurs unless the syntax of the operation history information before conversion is registered in the syntax rule information storage unit 15. On the other hand, as shown in FIG. 14, it is possible to specify, using the learning model 19, a syntax rule used for the syntax conversion of the operation history information before conversion without a syntax conversion error.

The user may designate whether to use the learning model 19. Alternatively, whether to use the learning model 19 may be automatically determined. For example, the process of comparing the syntax of the operation history information before conversion with any one of the syntax set in the item "after conversion" in the syntax rule information as described in step 109 is performed first, and if there is no matching syntax, the learning model 19 is used.

In the above exemplary embodiment, Japanese is used as an example of the language having the non-uniform sentence structure, and English is used as an example of the language having the uniform sentence structure. It should be noted that the language having the uniform sentence structure is not limited to English.

As described above, according to the present exemplary embodiment, even when operation history information in different formats are acquired from the external systems, the formats of the operation history information are unified. Accordingly, since the operation history information are provided in the single format for a subsequent process using the operation history information, it is possible to use the operation history information in the subsequent process regardless of the formats of the operation history information in the external systems which are the acquisition destinations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor programmed to:
acquire operation history information, the operation history information being acquired from at least one of a workflow server via an application programming interface, a repository owned by an external database system and an external system, the operation history information being acquired upon receipt, from a user, of a command and predetermined acquisition information;
convert at least one piece of the acquired operation history information into a unified format;
check whether the at least one piece of unified format operation history information is in a predetermined language, the predetermined language having a uniform sentence structure, and, when the at least one piece of unified format operation history information is not in the predetermined language, translating the at least one piece of unified format operation history information into the predetermined language;
determine whether or not to use a learning model to change the syntax of the at least one piece of unified format operation history information in the predetermined language,
wherein when it is determined to use the learning model, the at least one piece of unified format operation history information is changed using the learning model, the learning model trained on input data including new syntax and on output data referring to the new syntax in a supervised machine learning process to produce converted operation history information, the output data prepared by an administrator, and
wherein when it is determined not to use the learning model, the determining includes further determining whether syntax conversion is necessary and, when it is determined that the syntax conversion is necessary, convert the syntax of the at least one piece of operation history information using a predetermined syntax rule to produce the converted operation history information; and
arrange and integrate the converted operation history information in chronological order.

2. The information processing device according to claim 1, wherein the processor is further configured to:
acquire user information conversion information in which representations of user information included in the acquired operation history information are associated with representations of user information used in the unified format operation history information; and convert, with reference to the user information conversion information, the representation of the user information included in each acquired operation history information into the representation of the user information used in the unified format operation history information.

3. A non-transitory computer readable recording medium storing a program that causes a computer to execute information processing, the information processing comprising:
acquiring operation history information, the operation history information being acquired from at least one of a workflow server via an application programming interface, a repository owned by an external database system and an external the system, the operation history information being acquired upon receipt, from a user, of a command and predetermined acquisition information;
converting at least one piece of the acquired operation history information into a unified format;
checking whether the at least one piece of unified format operation history information is in a predetermined language, the predetermined language having a uniform sentence structure, and, when the at least one piece of unified format operation history information is not in the predetermined language, translating the at least one piece of unified format operation history information into the predetermined language;
determining whether or not to use a learning model to change the syntax of the at least one piece of unified format operation history information in the predetermined language,
    wherein when it is determined to use the learning model, the at least one piece of unified format operation history information is changed using the learning model, the learning mode trained on input data including new syntax and on output data referring to the new syntax in a supervised machine learning process to produce converted operation history information, the output data prepared by an administrator, and
    wherein when it is determined not to use the learning model, the determining includes further determining whether syntax conversion is necessary and, when it is determined that the syntax conversion is necessary, convert the syntax of the at least one piece of operation history information using a predetermined syntax rule to produce the converted operation history information: and
arranging and integrating the converted operation history information, in chronological order.

4. An information processing device comprising:
acquiring means for acquiring operation history information, the operation history information being acquired from at least one of a workflow server via an application programming interface, a repository owned by an external database system and an external the system, the operation history information being acquired upon receipt, from a user, of a command and predetermined acquisition information;
converting means for converting at least one piece of the acquired operation history information into a unified format;
checking means for checking whether the at least one piece of unified format operation history information is in a predetermined language, the predetermined language having a uniform sentence structure, and, when the at least one piece of unified format operation history information is not in the predetermined language, translating the at least one piece of unified format operation history information into the predetermined language;
determining means for determining whether or not to use a learning model to change the syntax of the at least one piece of unified format operation history information in the predetermined language,
    wherein when it is determined to use the learning model, the at least one piece of unified format operation history information is changed using the learning model, the learning model trained on input data including new syntax and on output data referring to the new syntax in a supervised machine learning process to produce converted operation history information, the output data prepared by an administrator, and
    wherein when it is determined not to use the learning model, the determining includes further determining whether syntax conversion is necessary and, when it is determined that the syntax conversion is necessary, convert the syntax of the at least one piece of operation history information using a predetermined syntax rule to produce the converted operation history information: and
arranging and integrating means for arranging and integrating the converted operation history information, in chronological order.

\* \* \* \* \*